Aug. 5, 1952  E. A. WATERTON  2,605,578
DEAD BAIT AND DEAD BAIT TACKLE FOR FISHING
Filed May 24, 1948

INVENTOR
EDMUND A. WATERTON, DECEASED,
DOUGLAS J. W. DRYBURGH,
AMINISTRATOR

By
*Lucke Lucke*
Attorney

Patented Aug. 5, 1952

2,605,578

UNITED STATES PATENT OFFICE 2,605,578

DEAD BAIT AND DEAD BAIT TACKLE FOR FISHING

Edmund Alfred Waterton, deceased, late of London, England, by Douglas James Watherston Dryburgh, administrator, London, England, assignor to E. G. Watershaw, Inc., Dover, Del., a corporation of Delaware Application May 24, 1948, Serial No. 28,945
In Great Britain July 31, 1947

3 Claims. (Cl. 43—44.2)

This invention concerns improvements in or relating to dead bait for fishing and to dead bait fishing tackle, particularly of the kind in which a dead fish or other appropriate dead bait is mounted upon a flight of hooks so as to be capable of sliding up the fishing line when a fish is hooked, whereby the bait is unlikely to be destroyed and consequently can be used again. The invention is especially but not exclusively applicable to silver and golden sprat bait.

In my co-pending application Serial No. 28,456 filed May 21, 1948, now abandoned, there is described an improved form of dead bait which, after being subjected to a preservation treatment, is coated entirely with a waterproof coating or sealing material which leaves the bait flexible to a substantial degree and which itself remains of a non-brittle flexible character for a considerable period. For the purpose of the present invention dead bait is similarly treated.

A preferred form of the waterproof coating or sealing material is made up as follows:

| | Parts |
|---|---|
| Vinylite resin VYHH | 28 |
| Di-octyl phthalate | 10 |
| Acetone | 9 |
| Methyl ethyl ketone | 16 |
| Methyl isobutyl ketone | 8 |
| Xylol | 29 |

It may, however, be that other similar materials may be suitable for the purpose but for the present invention it is important that when dry, the coating or sealing material should remain flexible so that the bait may be bent without the coating rupturing.

The waterproof coating or sealing material is preferably transparent and dries with a glossy surface so that the finished bait has a very lifelike appearance, it aparently having the glow and flexibility of a live bait.

Several layers of the waterproof coating or sealing material may be applied to the bait in succession and the application of material may be effected by brushing, spraying, dipping or in any other appropriate manner.

According to the present invention the bait is provided with one or more deformable inserts which may be used to impart to the bait any desired shape. Thus the insert or inserts can be used to impart a twist or the like to the general shape of the bait so that as the latter is pulled through the water it will spin, dive and generally simulate the movement of a live bait. The degree of twist imparted to the bait may be varied at will to suit the rate of flow of the water in which it is to be used.

As stated previously the invention is especially applicable to silver and golden sprat bait, and it is a further feature of the invention that such fish need not be gutted before being preserved and coated with the waterproof coating or sealing material. Leaving the fish ungutted makes the bait more durable due to the avoidance of the formation of increased entrances to the fish and by reducing to a minimum the interference with the structure of the fish. Eliminating the gutting of the fish also preserves its appearance and reduces the tendency of the fish to shrivel and so become disfigured and unnatural in appearance. Furthermore, the process of stuffing the fish with cotton wool or the like becomes unnecessary.

In order that the nature of the invention and the method of carrying same into effect may be more thoroughly understood one embodiment of same will now be described with reference to the accompanying drawings in which.

Figure 1:
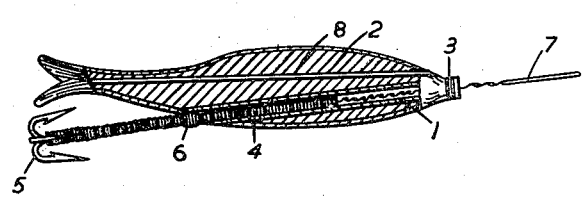
Figure 1 is a part-side and part-sectional view of a silver sprat bait to illustrate an application of the present invention.
Figure 2:
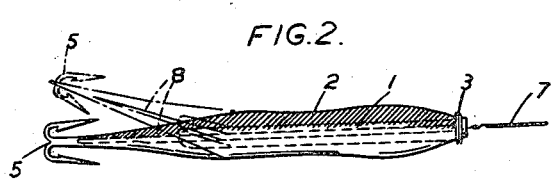
Figure 2 is a plan view of the silver sprat bait shown in Figure 1.

In the silver sprat bait shown in Figure 1 a lead tube 1 is rammed into the mouth of the bait, such tube passing obliquely through the body 2 of the bait and terminating at the exterior of the latter under the belly part thereof, approximately midway between the head and tail of the bait. The mouth of the bait is bound tightly around the tube 1 with a suitable fine wire 3. The wire or like hook carrier 4 (hereinafter referred to inclusively as the "gut" hook carrier) of the flight of hook 5 is, in use, passed through the tube 1, the gut hook carrier being enlarged at 6 to prevent the hooks 5 being drawn too close to the bait.

The inclination of the tube 1 with respect to the longitudinal axis of the bait is such that the gut hook carrier 4 passing through the tube will extend under the bait closely adjacent thereto, so that the bait hides the gut hook carrier and hooks are masked by or merged into the bait.

The portion of the gut hook carrier 4 which is exposed below the rear portion of the bait is formed of a durable ductile material so that it may be bent closely against the body of the bait and if this relationship is disturbed, may subsequently be replaced in that condition so that the above-mentioned concealment or masking of the gut hook carrier and hooks may be maintained. The gut hook carrier may be coated with the hereinbefore-mentioned flexible transparent coating or sealing material so as to protect it whilst leaving it pliable.

The front end 7 of the gut hook carrier is looped in the usual manner to enable it to be attached easily to a fishing line.

Passed into the bait so as to lie adjacent the spine or equivalent of the latter is a deformable insert 8. Only one insert is shown in the drawings but two or more may be employed if desired. The insert 8 is made from any suitable ductile material, for example copper wire, and is in the example illustrated pushed into the bait between its eyes, along its back close to the spine and into the tail.

In practice the insert 8 is positioned in the bait before the latter is coated with the waterproof sealing or coating material.

The insert 8 may be left in or may be removable from the finished bait as desired, the object of the insert being to impart to the bait a spiral or other twist so that when the bait is pulled through the water it will spin, dive and generally simulate the movement of a live bait. The degree of twist imparted to the bait may be varied at will to suit the rate of flow of the water in which it is to be used.

In the case of a removable insert this is used to impart the required twist to the bait before the latter is coated with waterproof sealing or coating material and is left in position for some time, conveniently about ten days, after such coating has been applied. If it is then removed it will be found that the bait, though easily flexible, has assumed a substantially permanent twisted shape. The opening left in the bait by the removal of the insert can be sealed by a small quantity of the waterproof sealing or coating material.

The eyes of the bait may be overpainted to give them a live appearance. Also the bait may be coloured and this is preferably effected by the use of an aniline dye which is solvent in acetone. This colouring matter is added to the waterproof coating or sealing material before the latter is applied to the bait. It will be understood that any suitable alternative colouring material may be used but it is preferred not to apply this direct to the bait before the latter is coated with waterproof sealing or coating material if such colouring matter tends to make the bait shrivel.

Opposite sides of the bait can be differently coloured.

I claim:

1. Dead bait for fishing comprising a dead, ungutted marine creature; a tube extending through a portion only of the length of said creature to accommodate a gut hook carrier; and a flexible, non-brittle, waterproof coating sealing the exterior of said creature and sealing said tube within said creature; in combination with a deformable member extending separately through a different portion of said creature from that portion through which said tube extends; whereby the portion of said creature through which said deformable member extends may be bent in greater degree than that portion through which said tube extends, and whereby said creature will retain such bent shape.

2. Dead bait for fishing comprising a dead, ungutted fish; a tube extending obliquely through said fish from its mouth to an opening under the belly part thereof to accommodate a gut hook carrier having a hook fixed to its end under the bell part of said fish, whereby the fish hides the gut hook carrier and masks the hook fixed thereof; and a flexible, non-brittle, waterproof coating sealing the exterior of said fish and sealing said tube within said fish; in combination with a deformable member extending longitudinally of said fish through a different portion thereof from that through which said tube extends; whereby the portion of said fish through which said deformable member extends may be bent in greater degree than that portion through which said tube extends, and whereby said fish will retain such bent shape.

3. Dead bait for fishing comprising a dead, ungutted fish; a tube extending obliquely through said fish from its mouth to an opening under the belly part thereof; and a flexible, non-brittle waterproof coating sealing the exterior of said fish and sealing said tube within said fish; in combination with a separate deformable wire inset extending longitudinally completely through said fish substantially from end to end thereof and into the tail; a gut hook carrier extending through said tube; and a hook fixed to the end of said hook carrier under the belly part of said fish; said hook carrier having an enlarged portion near the end thereof to which said hook is fixed to limit relative sliding movement of said hook carrier and said fish in one direction; whereby the portion of said fish through which said wire inset extends, including the tail thereof, may be bent in greater degree than that portion through which said tube extends; and whereby said fish will retain such bent shape.

DOUGLAS JAMES WATHERSTON
DRYBURGH.

*Administrator of the Last Will and Testament of Edmund Alfred Waterton, Deceased.*

REFERENCES CITED

The following references are of record in the file of this patent:

UNITED STATES PATENTS

| Number | Name | Date |
|---|---|---|
| 1,259,782 | Savage | Mar. 19, 1918 |
| 2,017,333 | Zuck | Oct. 15, 1935 |
| 2,047,957 | Fletcher | July 21, 1936 |
| 2,093,954 | Chilcott | Sept. 21, 1937 |
| 2,157,333 | Hadaway | May 9, 1939 |
| 2,164,708 | Hadaway | July 4, 1939 |

FOREIGN PATENTS

| Number | Country | Date |
|---|---|---|
| 443,400 | Great Britain | Feb. 27, 1936 |